United States Patent Office 3,120,369
Patented Feb. 4, 1964

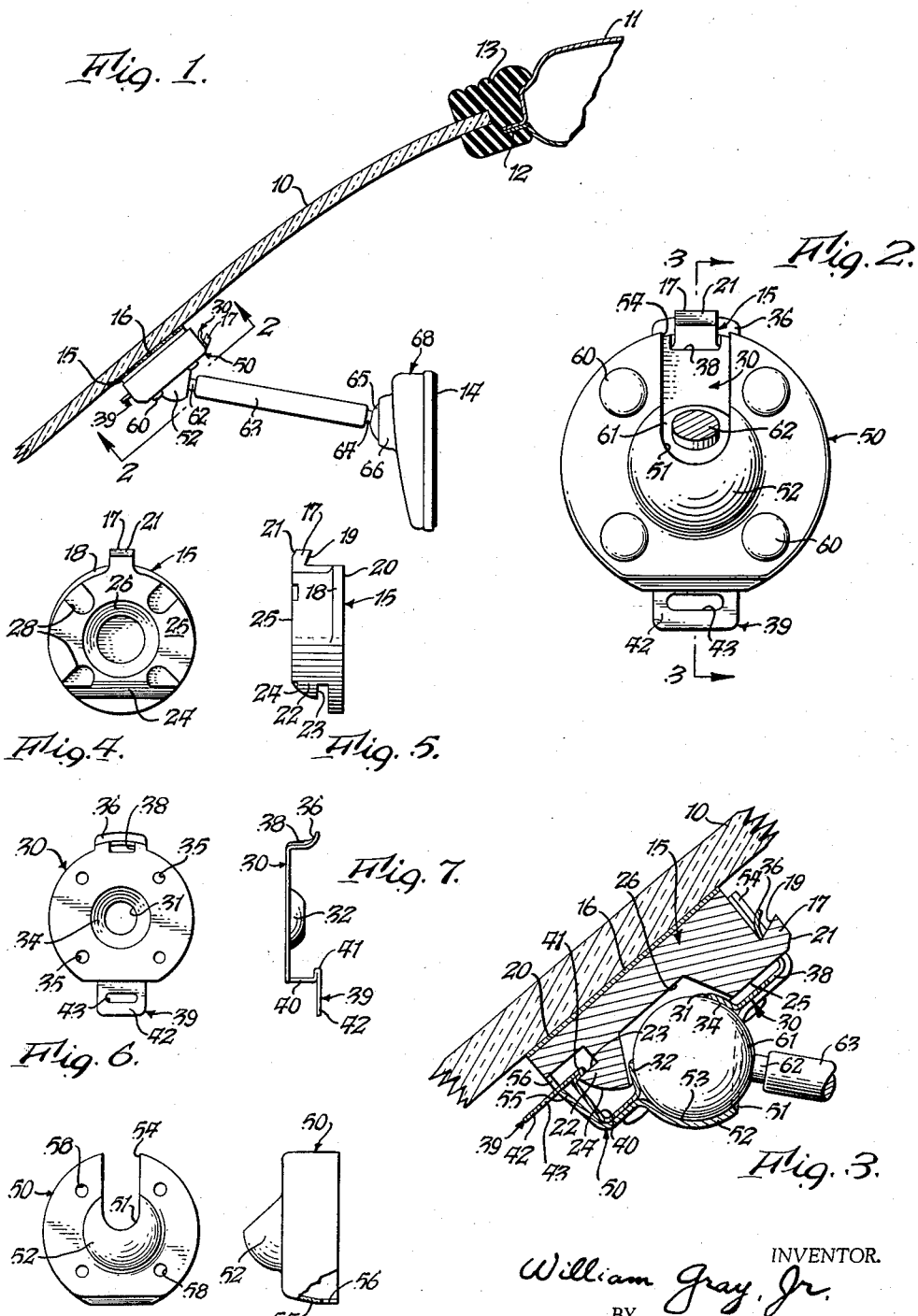

3,120,369
SUPPORT FOR ATTACHING A REAR VISION MIRROR TO A WINDSHIELD
William Gray, Jr., Lake View, N.Y., assignor to Standard Mirror Company, Inc., Buffalo, N.Y., a corporation of New York
Filed Dec. 26, 1961, Ser. No. 161,988
4 Claims. (Cl. 248—223)

This invention relates to a support for mounting a rear vision mirror directly on the windshield of an automobile and more particularly to such a support the base for which is cemented directly on the inside face of the windshield.

The trend toward windshields having a pronounced back sweep results in the top part of the windshield being at an angle of 40° or less to the horizontal and extending well back along the roof of the automobile. This complicates the problem of mounting the rear vision mirror on the frame of the automobile since it is desirable to have the rear vision mirror near the center of the car and above but well in front of the eyes of the driver. This location is considerably distant from the frame of the automobile with a windshield having such a pronounced back sweep.

It has been heretofore proposed to mount the rear vision mirror directly on the glass windshield by cementing its base to the windshield. However, when this is done, it is desirable that the base be cemented on the windshield before the windshield is attached in the car body, and under these circumstances it is desirable to have this base shallow to facilitate nesting of the windshields for storing and packaging.

It is a principal object of the present invention to provide a support for a rear vision mirror including a base having one face adapted to be cemented to the inside of a glass windshield in which the base projects such short distance from the windshield that it does not interfere with present normal cartoning of windshields.

It is another important object to provide such a support which securely holds the rear vision mirror to the windshield and provides a vibration free mounting therefor.

It is another important object of the invention to provide such a support in which the base and other parts of the mounting are of minimum size so as not to interfere with the forward view of the driver through the windshield.

Another object of the invention is to provide such a rear vision mirror assembly which, except for the base, can be prefabricated and quickly applied to the base at the automobile assembly plant.

Another object is to provide such a support which can be applied without tools, particularly without a screw driver directed toward the windshield, which could injure the windshield, the rear vision mirror assembly being secured to the base by a simple snap fit member having a spring catch latching it and the rear vision mirror assembly to the base.

Another object of the invention is to provide such a rear vision mirror support which permits the rear vision mirror to be moved a wide distance up and down as well as horizontally and also permits the rear vision mirror to be adjusted through a wide angle about both vertical and horizontal axes to adapt its use to all heights of drivers as well as to their position.

Another object is to provide such a mounting which is attractive in apperance and provides a desirable accessory conforming to the swept back windshields.

Another object is to provide such a support from which the rear vision mirror can only be detached by one having special knowledge of the construction of the mounting thereby to reduce the hazard of pilferage.

Other objects and advantages of the invention will be apparent from the following description and drawings in which:

FIG. 1 is a fragmentary vertical section through the upper part of the swept back windshield and its mounting to the roof of an automobile and showing, in side elevation, a rear vision mirror support embodying the present invention and carrying a rear vision mirror assembly.

FIG. 2 is an enlarged section taken generally on line 2—2, FIG. 1.

FIG. 3 is a fragmentary vertical central section through the support embodying the present invention and the adjacent part of the windshield, this section being taken generally on line 3—3, FIG. 2.

FIG. 4 is a plan view of the block or casting which forms the base of the support and which is cemented to the windshield.

FIG. 5 is a vertical side elevational view thereof.

FIG. 6 is a plan view of the spring plate which forms a half socket for the ball-and-socket mounting for the rear vision mirror assembly and which includes a spring latch for attachment to the base block.

FIG. 7 is a side elevational view thereof.

FIG. 8 is a plan view of the cap plate which is attached to the spring plate and which forms the other half socket for the ball-and-socket mounting for the rear vision mirror assembly.

FIG. 9 is a side elevational view thereof.

The rear vision mirror support forming the subject of the present invention is particularly adapted to be used in conjunction with an automobile having a windshield 10 the upper part of which has the pronounced back sweep illustrated in FIG. 1 and which results in the upper part of the windshield having an angularity of 40° or less with reference to the horizontal end forming a part of the roof of the automobile. The roof frame is illustrated at 11 as having a flange 12 projecting into the windshield opening and as fitting into the rubber rim or frame 13 of the windshield in a manner to obtain a substantially weather-tight mounting for the windshield.

In order to mount the rear vision mirror panel 14 at a desirable elevation in the center of the automobile well in advance of the driver it has heretofore been proposed to cement the base of its support directly to the windshield. With the present invention, the base is indicated at 15 and the layer of cement uniting this base to the windshield 10 is indicated at 16.

With the present invention, the base is in the form of a generally circular die casting having a projection or finger 17 projecting upwardly from its rim 18, the face 19 of this finger providing a shoulder opposing the windshield 10. Preferably this shoulder 19 is undercut, that is, arranged at an acute included angle with reference to that face 20 of the base which is adhesively secured to the windshield 10. Also preferably the corner on the opposite side from the face or shoulder 19 is bevelled as indicated at 21 to facilitate the attachment of a spring plate as hereinafter described.

The lower part of the base 15 is formed to provide a downwardly projecting catch 22, this downwardly projecting catch having a vertical catch face or shoulder 23 which opposes the windshield 10. This side of the catch 22 opposite from the shoulder 23 is rounded to provide a cam face 24 leading to the lower or outboard edge of the shoulder to facilitate the application of the spring plate as hereinafter described.

The face 25 of the base 15 opposite from its face 20 adhesively attached to the windshield 10 is provided with a large central depression 26 and this face 25 is provided with four equally spaced smaller depressions 28 surrounding the large central depression 26.

The spring plate which is latched to the base 15 is indicated generally at 30 and comprises a generally circular plate made of spring sheet metal and having a central opening 31 surrounded by a spherical offset 32 which is arranged in the central depression 26 of the base 15 in the assembled condition of the parts and which forms a spherical seat 34. The spring plate 30 is also provided with four equally spaced holes 35 which are adapted to register with the smaller depressions 28 of the base 15. The spring plate is also provided at its upper end with an ear 36 which is offset toward the windshield 10 and is provided with an opening or aperture 38 adapted to receive the upward projection 17 of the base plate 15 and to fit against the rear shoulder 19 thereof. At its lower end the spring plate 30 is formed to provide a spring latch 39 adapted to engage the face or shoulder 23 of the catch 22 of the base. For this purpose, the latch 39 is in the form of an integral flange 40 projecting from the lower edge of the spring plate 30 toward the windshield 10 and the outboard extremity of this flange projects upwardly to form a latch 41 engaging with the catch face 23. This latch is thence continued downwardly to form a tab 42, this tab being provided with a screwdriver slot or hole 43, that is, an elongated hole adapted to receive the head of a screwdriver or similar instrument that can be used to pull or pry the tab parallel with the surface of the windshield.

The mounting is completed by a cap indicated generally at 50 and which is desirably made of sheet metal and plated or otherwise finished to conform to the trim of the automobile. This cap is shown as having a central opening 51 through an offset 52 which projects toward the driver and which forms a spherical concavity or seat 53 which opposes the concave or spherical seat 34 of the spring plate 30. The central through opening 51 is also shown as being continued upwardly in the form of a slot 54 which extends through the rim of the top part of the cap. This rim is indicated at 55 and projects toward the windshield 10 and serves to house and conceal the sides of the spring plate 30 and base 15, this rim also having a slot 56 at its bottom which fits around the latch 39 as best shown in FIG. 3. The cap 50 also has four holes 58 which register with the four holes 35 of the spring plate 30 and which pairs of holes are adapted to receive rivets 60 which secure the spring plate 30 and cap 50 in embracing relation with a ball 61 of the rear vision mirror assembly, this ball being in pressure contact with the spherical seats 34 and 53.

This ball is at the end of a neck 62 which forms a reduced extension of an arm 63, this neck working in the opening 51 and slot 54 of the cap 50. The other end of this arm 63 is formed to provide a similar reduced neck 64 for a second ball 65, the latter working in a socket 66 in the rear of a casing or housing 68 for the rear vision mirror panel 14. The ball and socket 65, 66 permit an angular adjustment of the mirror panel 14 about vertical and horizontal axes to obtain the desired aim and the ball and socket 61, 34, 53 permit the angular movement of the arms 63 both horizontally and vertically to obtain any desired position of the mirror panel 14. For this purpose, the ball 61 is held in frictional engagement with the seats 34 and 53 by the rivets 60.

It will be seen that mounting the rear vision mirror assembly is very simple, requiring no tools for the installation on the windshield. Thus, in making the rear vision mirror assembly with its double ball arm 63, the spring plate 30 and the cap plate 50 are secured to opposite sides of the ball 61 by means of the rivets 60, these parts being proportioned and secured in such manner as to provide the desired frictional resistance between the spherical seats 34 and 53 and the ball 61.

Thereafter, the upward projection or finger 17 is inserted into the aperture 38 in the apertured ear 36 at the top of the spring plate and the apertured ear 36 is brought downwardly to the base of this projection 17 and to fit against the shoulder 19 thereof. In this position, the latch projection 41 of the latch 39 is in position to engage the cam face 24 of the catch 22 at the bottom of the base 15. Accordingly, pressing the bottom of the cap 50 toward the windshield 10 causes this latch projection 41 to ride along the cam face 24 until it reaches the catch face 23 when it snaps into engagement with this catch face to securely hold the rear vision mirror assembly attached to the windshield.

Should it become desirable to dismount the rear vision mirror assembly, the garage mechanic can insert a screwdriver (not shown) into the slot 43 and pry or move the screwdriver downwardly so as to withdraw the tab 42 and latch projection 41 from engagement with the catch face 23 following which the lower part of the cap 50 and spring plate 30 can be pulled away from the windshield 10 and thereafter lifted to free the ear 36 at the upper end of the catch plate from the upward projection 18 of the base.

From the foregoing, it will be seen that the present invention provides a very simple mounting which minimizes the work required in attaching a rear vision mirror to a base cemented to a windshield and which also minimizes danger to the windshield as well as providing a secure mounting for the rear vision mirror assembly which at the same time can easily be released but only by one having knowledge of the construction of the parts.

What is claimed is:

1. A support for supporting a rear vision mirror assembly from the glass windshield of a vehicle, said rear vision mirror assembly including an attaching ball connected with a rear vision mirror panel, comprising a base having one face adapted to be secured directly to the inside face of said windshield, means providing a catch shoulder on said base facing said windshield, a plate having a spherical concavity seated against one side of said ball, a spring latch on said plate engageable with said catch shoulder on said base to secure said plate to said base, and means frictionally holding said ball against said spherical concavity, comprising a cap having a rim embracing the rim of said base and plate and having a central opening surrounded by a concavity seated against the opposite side of said ball, and means securing said cap to said plate, said rear vision mirror assembly extending through said central opening from said ball.

2. A support for supporting a rear vision mirror assembly from the glass windshield of a vehicle, said rear vision mirror assembly including an attaching ball connected with a rear vision mirror panel, comprising a base having one face adapted to be secured directly to the inside face of said windshield, means providing a pair of catch shoulders on opposite sides of said base each facing said windshield, a plate having a spherical concavity seated against one side of said ball, an extension at one side of said plate having an opening in which one of said catch shoulders is fitted, a spring latch on the other side of said plate engageable with the other catch shoulder of said base, and means frictionally holding said ball against said spherical concavity.

3. A support for supporting a rear vision mirror assembly from the glass windshield of a vehicle, said rear vision mirror assembly including an attaching ball connected with a rear vision mirror panel, comprising a base having one face adapted to be secured directly to the inside face of said windshield and surrounded by a rim, a projection extending from one side of said rim along said windshield, a catch shoulder on the opposite side of said rim and facing said windshield, said opposite side of said rim being provided with a cam face leading to the outboard edge of said catch shoulder, a spring plate having an integral apertured ear embracing said projection and having an integral spring latch engageable with said cam face and said catch shoulder to secure said spring plate to said base, and means frictionally holding said ball against said spherical concavity.

4. A support as set forth in claim 3 wherein said last means comprises a cap having a rim embracing the rims of said base and plate and having a central opening surrounded by a concavity seated against the opposite side of said ball, and means securing said cap to said plate, said rear vision mirror assembly extending through said central opening from said ball.

References Cited in the file of this patent

UNITED STATES PATENTS

| | | |
|---|---|---|
| 1,280,013 | Goddard | Sept. 24, 1918 |
| 1,971,396 | Waide | Aug. 28, 1934 |

FOREIGN PATENTS

| | | |
|---|---|---|
| 878,224 | Great Britain | Sept. 27, 1961 |
| 1,067,668 | Germany | Oct. 22, 1959 |